(12) United States Patent
Mikkola et al.

(10) Patent No.: US 11,170,536 B2
(45) Date of Patent: Nov. 9, 2021

(54) SYSTEMS AND METHODS FOR HOME IMPROVEMENT VISUALIZATION

(71) Applicant: Revive AI, Inc., Bellevue, WA (US)

(72) Inventors: Petteri Mikkola, Bellevue, WA (US); Devdatta Bhikaji Waghdhare, Sammamish, WA (US); Aneesh Shankar Hariharan, Tacoma, WA (US); Jon Carlson, Boulder, CO (US)

(73) Assignee: REVIVE AL, INC., Bellevue, WA (US)

( * ) Notice: Subject to any disclaimer, the term of this patent is extended or adjusted under 35 U.S.C. 154(b) by 81 days.

(21) Appl. No.: 16/577,859

(22) Filed: Sep. 20, 2019

(65) Prior Publication Data

US 2020/0098141 A1   Mar. 26, 2020

Related U.S. Application Data

(60) Provisional application No. 62/734,554, filed on Sep. 21, 2018.

(51) Int. Cl.
| | |
|---|---|
| *G06T 11/00* | (2006.01) |
| *G06N 3/08* | (2006.01) |
| *G06N 3/04* | (2006.01) |
| *G06K 9/62* | (2006.01) |
| *G06T 5/00* | (2006.01) |
| *G06K 9/46* | (2006.01) |

(52) U.S. Cl.
CPC ............ *G06T 11/00* (2013.01); *G06K 9/4604* (2013.01); *G06K 9/6256* (2013.01); *G06N 3/0454* (2013.01); *G06N 3/08* (2013.01); *G06T 5/006* (2013.01); *G06T 2207/20081* (2013.01); *G06T 2207/20084* (2013.01); *G06T 2210/04* (2013.01)

(58) Field of Classification Search
CPC ................................ G06T 11/00; G06T 5/006
See application file for complete search history.

(56) References Cited

U.S. PATENT DOCUMENTS

2019/0213438 A1\* 7/2019 Jones ........................ G06T 7/74

\* cited by examiner

*Primary Examiner* — Edward Park
(74) *Attorney, Agent, or Firm* — Wilson Sonsini Goodrich & Rosati

(57) ABSTRACT

A method of training a neural network for home improvement visualization is disclosed. The method may include receiving a set of annotated images of houses to train the neural network, augmenting the set of annotated images of houses to generate additional annotated images of houses for the neural network, processing the annotates images of houses and the additional annotated images of houses to train the neural network, refining the set of annotated images of houses by detecting the edges elements in the images and adjusting the annotations based on the edge detection, and outputting a trained neural network.

14 Claims, 11 Drawing Sheets

SYSTEMS AND METHODS FOR HOME IMPROVEMENT VISUALIZATION

CROSS REFERENCE

This application claims benefit of U.S. Provisional Patent Appl. No. 62/734,554, filed Sep. 21, 2018, the entire contents of which are incorporated by reference.

FIELD

The present disclosure relates to systems and methods for home improvement visualization. More particularly, to automated systems and methods for visualizing home improvements based on an image of a house.

BACKGROUND

Home owners and home buyers who want to make updates to a home, such as adding new windows, doors, garage, paint, siding, landscape, etc. struggle to picture what these improvements could look like, what they will cost, and who can provide the right materials and/or complete the work.

Attempts to aid in the visualization process fall short in many ways. Commonly, a user views each element in isolation, such as on display in a store, or installed on a house other than their own, either in person or via marketing materials. Users may also be provided with physical samples of proposed finishes, such as siding or concrete samples, or paint chips. Such methods rely on the user to build a mental image of what these elements would look like on their particular home.

Other methods that attempt to visualize home improvements rely on manual intervention to replace objects, in images or recreate an entire model of a house virtually. These attempts at visualization fall short in many respects. For example, they rely on skilled artisans to build a virtual 3-D model of a house or to digitally manipulate a photo with image editing software to copy and paste elements into an image of a house. These result in unrealistic results that are time consuming to create. Today there are solutions in the market that will allow you to create a rendering of your property and let you try out different looks, but these are not photo-realistic. Other solutions provide the tools to use and the user can update the look of their property on their own, but these are very manual, time-consuming and not very easy to get a high-quality rendering. These solutions often times also result in a look that's a combination of photo-realistic and artistic. As such there's nothing that's quite right or easy.

SUMMARY

What's missing today is a low-friction end-to-end solution that provides a home owner or prospective buyer with a realistic visualization of potential home improvement projects and ideas.

Described herein are systems and methods that provide for visualizing home improvements based on an image of a house. As described herein, a method for modifying an exterior home image with a photo-realistic rendering of these modifications is provided. The method, without user input, automatically or semi-automatically identifies and then replaces elements of the exterior of the home, such as doors, windows, garage, paint, siding, etc. with new elements determined by a user or provided by a predetermined set of elements. In some embodiments, the method also provides an automated costing for the modifications and connects users to suppliers and contractors who can complete the work.

Advantages of the systems and methods described herein include automated presentation of modification to an exterior of the home and an end-to-end user experience that takes the user from visualization, to cost estimates connecting them to a supplier, a group of suppliers, or service providers.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

A better understanding of the features and advantages of the present disclosure will be obtained by reference to the following detailed description that sets forth illustrative embodiments, in which the principles of embodiments of the present disclosure are utilized, and the accompanying drawings.

Although the detailed description contains many specifics, these should not be construed as limiting the scope of the disclosure but merely as illustrating different examples and aspects of the present disclosure. It should be appreciated that the scope of the disclosure includes other embodiments not discussed in detail herein. Various other modifications, changes and variations which will be apparent to those skilled in the art may be made in the arrangement, operation and details of the methods, systems, and apparatus of the present disclosure provided herein without departing from the spirit and scope of the invention as described herein.

Although the disclosure below is described with reference to a 2-D image of a residential house, it is understood that the embodiments described herein apply to other image types and structures, such as 3-D images and apartment buildings, townhomes, condos, multifamily housing, such as duplexes, and commercial and industrial structures.

Figure 1:
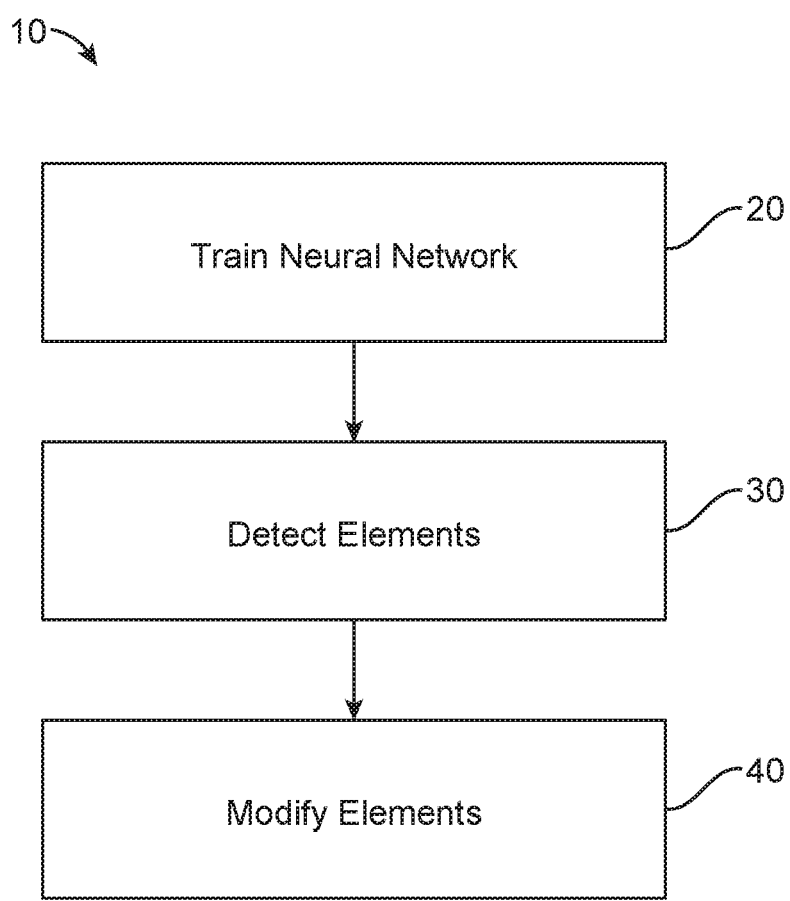
FIG. 1 illustrates a method of visualizing home improvements according to one or more embodiments disclosed herein.

FIG. 1 illustrates a method 10 for visualizing home improvements. The method includes training a neural network to detect elements of a house, detecting elements of a house from an image of a house, and modifying the image of the house by replacing the detected elements with different replacement elements.

At block 20, a method 200 of training a neural network is carried out. In some embodiments, the neural network, which may be a deep neural network, is trained using deep learning techniques. In some embodiments the neural network architecture is modified and refined using statistical learning or other machine learning techniques. Training the neural network may include training the neural network on a set of labeled and annotated images of houses. The labeled images may include one or more regions of the image that corresponds to house, its landscape and further include elements of the house in the image, such as a window, door, siding, etc. The labeled image may also include the style of the house and the elements of the house and landscaping. The labeling may include characteristics of the element, such as element type, color, material, style, etc. Training may also include the use of edge detection to refine the boundaries of the regions in the image.

The neural network may also be trained to determine relative size and position of elements based on the image coordinates of the elements within the image and a set of objects with known standard sizes. For example, front doors, one and two car garages. From these, the neural network can determine the sizes of other elements, such as the sizes of windows, trim, siding, roofing, etc.

In some embodiments, augmented image data are added to the original image annotations and the neural network is trained to determine relative size of image coordinates, such that when used, the output from the neural network is further fine-tuned using segmentation algorithms to precisely identify elements and their image coordinates within the image.

In some embodiments, a user may collect new data, such as by taking pictures of homes. The new data may be provided to the neural network and the user may view the results, such as identified or replaced garage doors, front doors, windows. Then, the user may provide feedback based on the results. The feedback may confirm the output is accurate, it may be modifying the identification of the features of the image or the replaced features or indicate that certain of the features were miss identified or replaced. This data along with the feedback is looped back into either automatic additional training for the model or outputs with poor quality get sent for re-annotation then training. In this way, the tasks of quickly scaling data that is required for training is automated by using the already well performing neural network models which can be repurposed across different applications.

In some embodiments, during training, the annotated image data are augmented by adding Poisson or Gaussian noise, rotation, flips, blurring, and changing color channels and/or between color paces, for example, between RGB and HSV or other color spaces. The above image augmentations and image processing are used to generate synthetic data that allows the deep neural network to be trained better, reduces the number of unique images for training compared to non-augmented training, and aids in training the model to identify elements in images taken at unlevel angles, and with different qualities and in different color spaces.

The neural network may also be trained differently for non-rectangular shaped objects in order to provide appropriate outputs to the front end for more accurate replacements. For example, while most garage doors are rectangular, there are homes that have arched and polygonal (dog-eared doors). These non-rectangular doors may be in place of or in addition to standard rectangular garages on a home. The training may include training a neural network model to identify arched, dog eared, or other features of a door, window, etc. For example, a model may be trained by annotating the features of an element that are non-standard. For a garage door, this may include a polygon that defines or surrounds the dog-ears in a garage or the arch of a garage. Such a model or models, may be used to identify door types and then, to properly identify and locate the particular features of a non-standard element, a neural network may be trained to identify 'inner' and 'outer' boundaries of the garages that is then used to identify the boundary of such non-standard elements.

The neural network models for detecting and processing the varying shapes may be trained with annotated images. A first model that detects the outer regions of the garage door. May be trained with images annotated by a quadrilateral, such as a square or rectangle, that may be inscribed within the shape of door and may define the outer width of the door along with a height of the door below, for example, the dog ears. A second model that detects the location of the inner vertices of the upper portion of the garage door may be trained with images annotated with the location of the inner vertices, such as by the triangle inscribed within the door. For example, at the intersection of the dog ears with the upper horizontal frame of the door.

Inner and outer models may be trained for identifying the shape of an arched garage door. A model for detecting outer regions may be trained by images annotated by a quadrilateral, such as a square or rectangle, that may be inscribed within the shape of door and may define the outer width of the door along with a height of the door below, for example, the beginning or lower edge of the arch. A second model may be trained to determine the location of the top of the arch of the upper portion of the garage door by images annotated with a quadrilateral that defines the extent of the arch, for example such that the arch is inscribed within the quadrilateral.

The outputs from this training approach provide the front-end application key identifiers for the type of garage along with coordinates which can be used to accurately replace the identified object.

Since there now exists different shaped doors, beyond one-car and two-car for garages, an initial machine learning model, such as a neural network, is trained and used in identifying the type of door, such as an arched garage, polygonal garage or rectangular garage and determines which sub-model/deep neural network for that respective shape that should be used for follow-on object detection and selection. This model may be trained as a single model with an equal distribution of door types. The doors may be annotated for their unique characteristic. For example, the annotations may include polygons around the arch, the dog ears, or the 90-degree upper corners of a rectangular garage and not the full door. In some embodiments, this decision process can be expected to go down multiple levels, depending on the level of granularity sought.

Figure 4A:
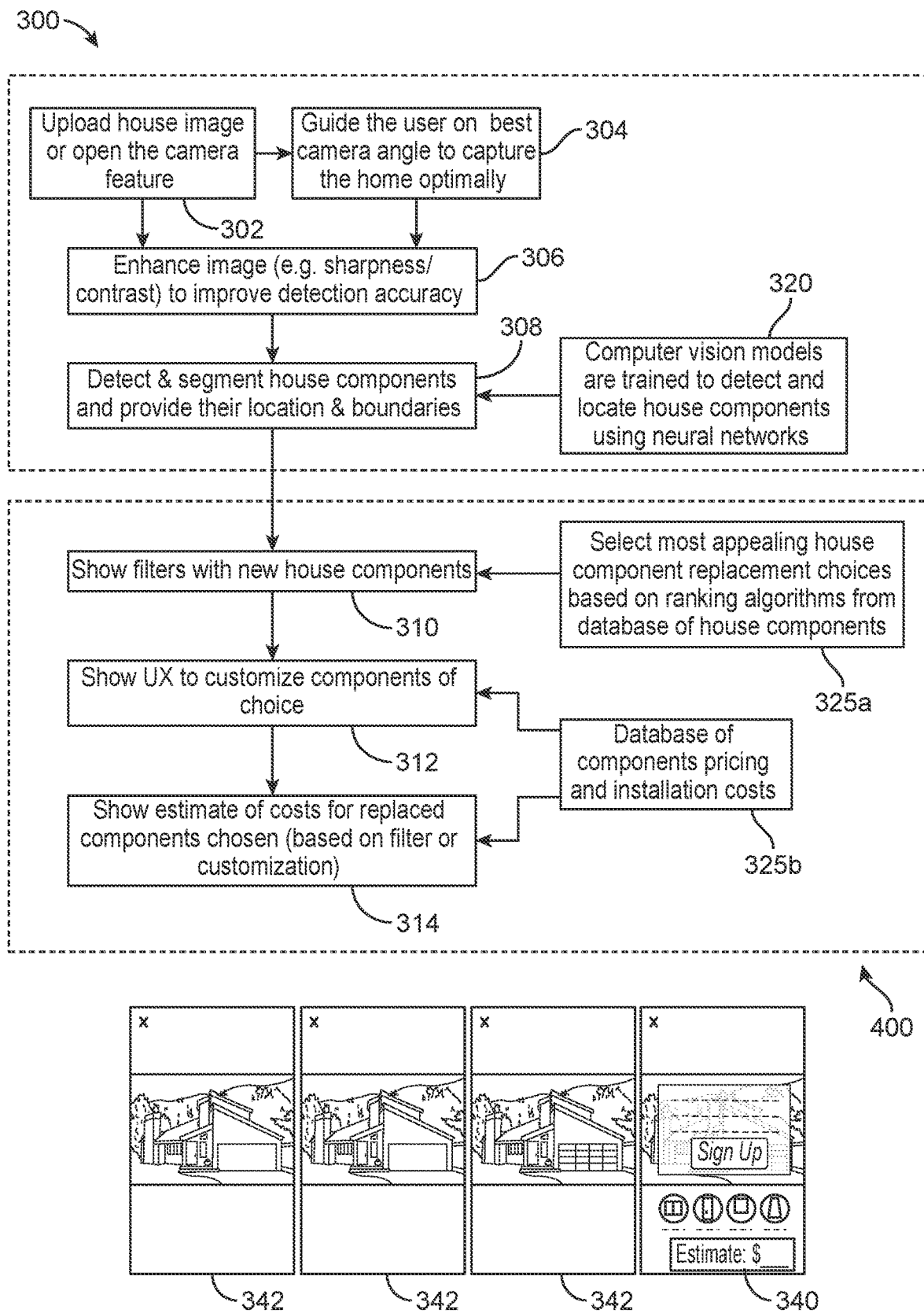
FIG. 4A illustrates a method identifying and replacing elements of a house within an image according to one or more embodiments disclosed herein.
Figure 4B:
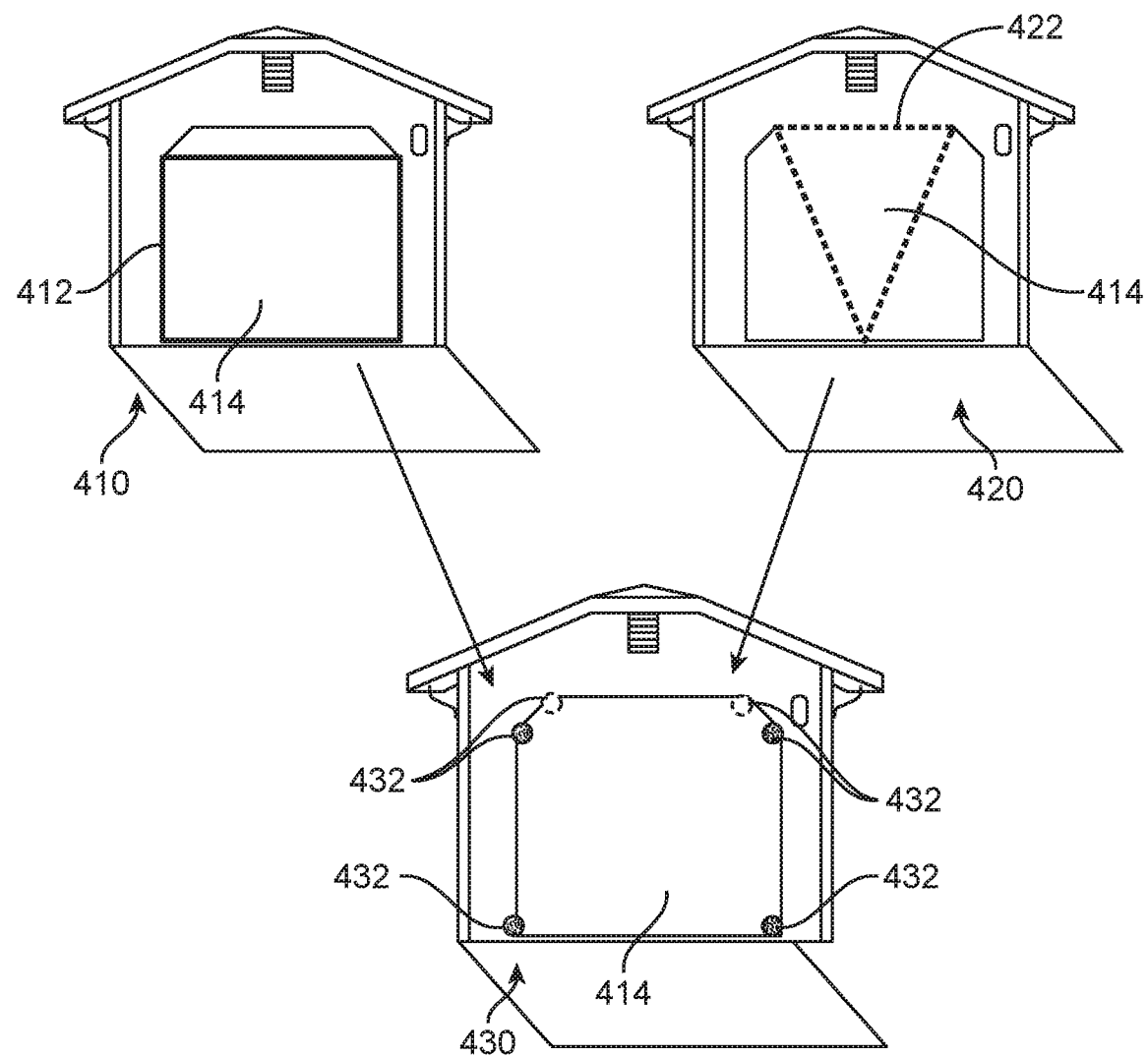
FIGS. 4B and 4C depict the identification of garage doors of FIG. 4A accordingly to one or more embodiments disclosed herein.

FIG. 4B depicts steps in a method for identifying the shape of a polygonal garage door. After identifying that the garage door 414 is a polygonal door, the image may be processed by two neural network models. A first model detects the outer regions of the garage door and a second model detects the inner regions of the garage door. The outer regions may be defined by a quadrilateral 412, such as a square or rectangle, that may be inscribed within the shape of door and may define the outer width of the door along with a height of the door below, for example, the dog ears. The first model determines the location of the four vertices that define the quadrilateral. The second model determines the location of the inner vertices of the upper portion of the garage door. For example, at the intersection of the dog ears with the upper horizontal frame of the door. Once these locations are determined, the coordinates of the six vertices may be used to define the shape of the garage door element.

Figure 4C:
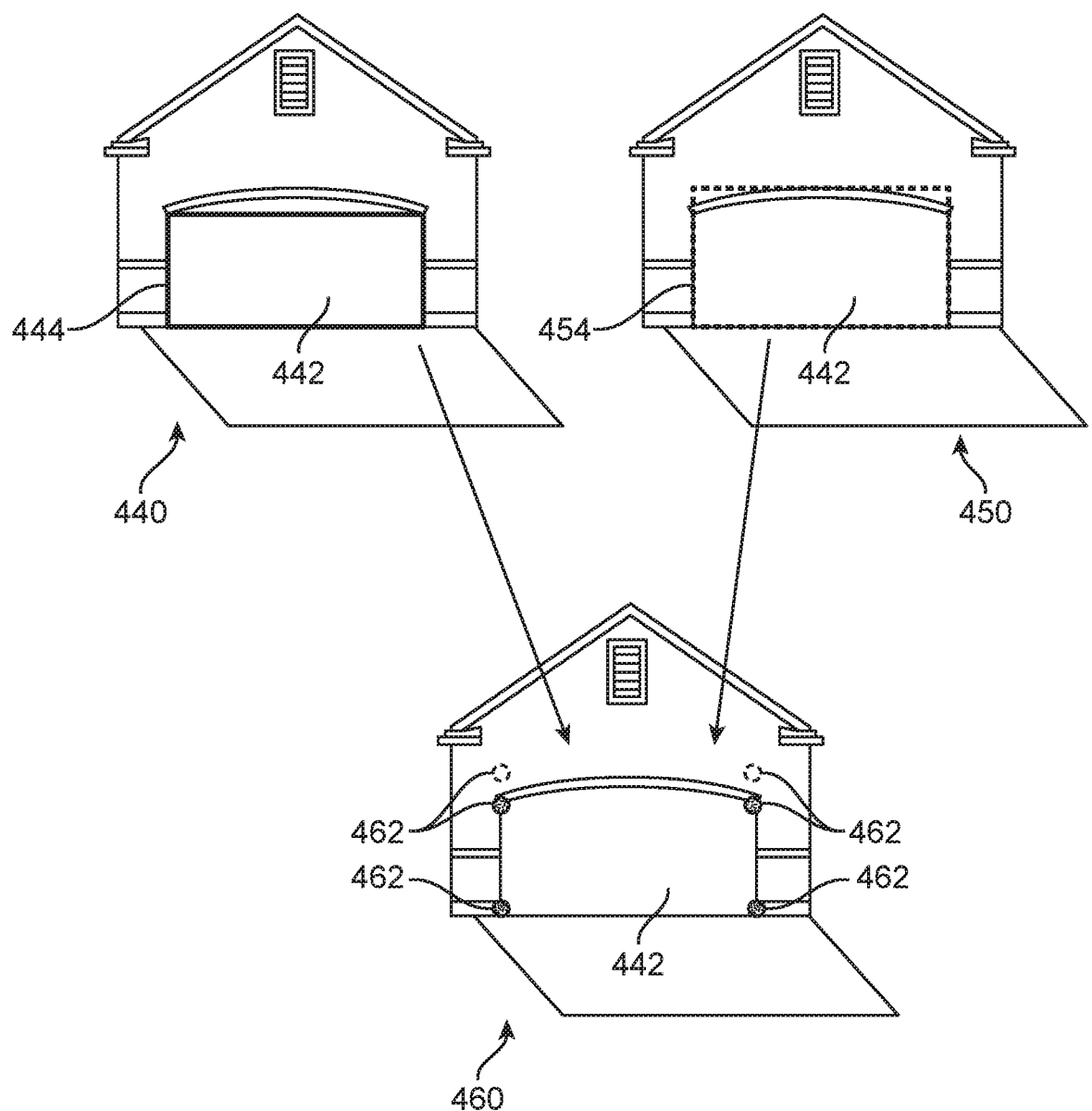

FIG. 4C depicts steps is a method for identifying the shape of an arched garage door. After identifying that the garage door 442 is an arched door, the image may be processed by two neural network models. A first model detects the outer regions of the garage door and a second model detects the inner regions of the garage door. The outer regions may be defined by a quadrilateral 444, such as a square or rectangle, that may be inscribed within the shape of door and may define the outer width of the door along with a height of the door below, for example, the beginning or lower edge of the arch. The first model determines the location of the four vertices that define the quadrilateral. The second model determines the location of the top of the arch of the upper portion of the garage door. For example, at the apex of the arch of the frame of the door. Once these locations are determined, the coordinates of the six vertices may be used to define the shape of the garage door element.

Although described above with respect to garage doors, this approach may be used for other elements of a house, such as windows, entry doors, driveways, roof lines, etc. In addition, the sub-models or sub-neural networks used to detect the respective shapes and features of the elements, may be trained using images with elements identified and annotated for their unique characteristic. For example, the annotations may include polygons around the arch, the dog ears, or the 90-degree upper corners of a rectangular garage and not the full door, as discussed, for example, above.

Figure 2:
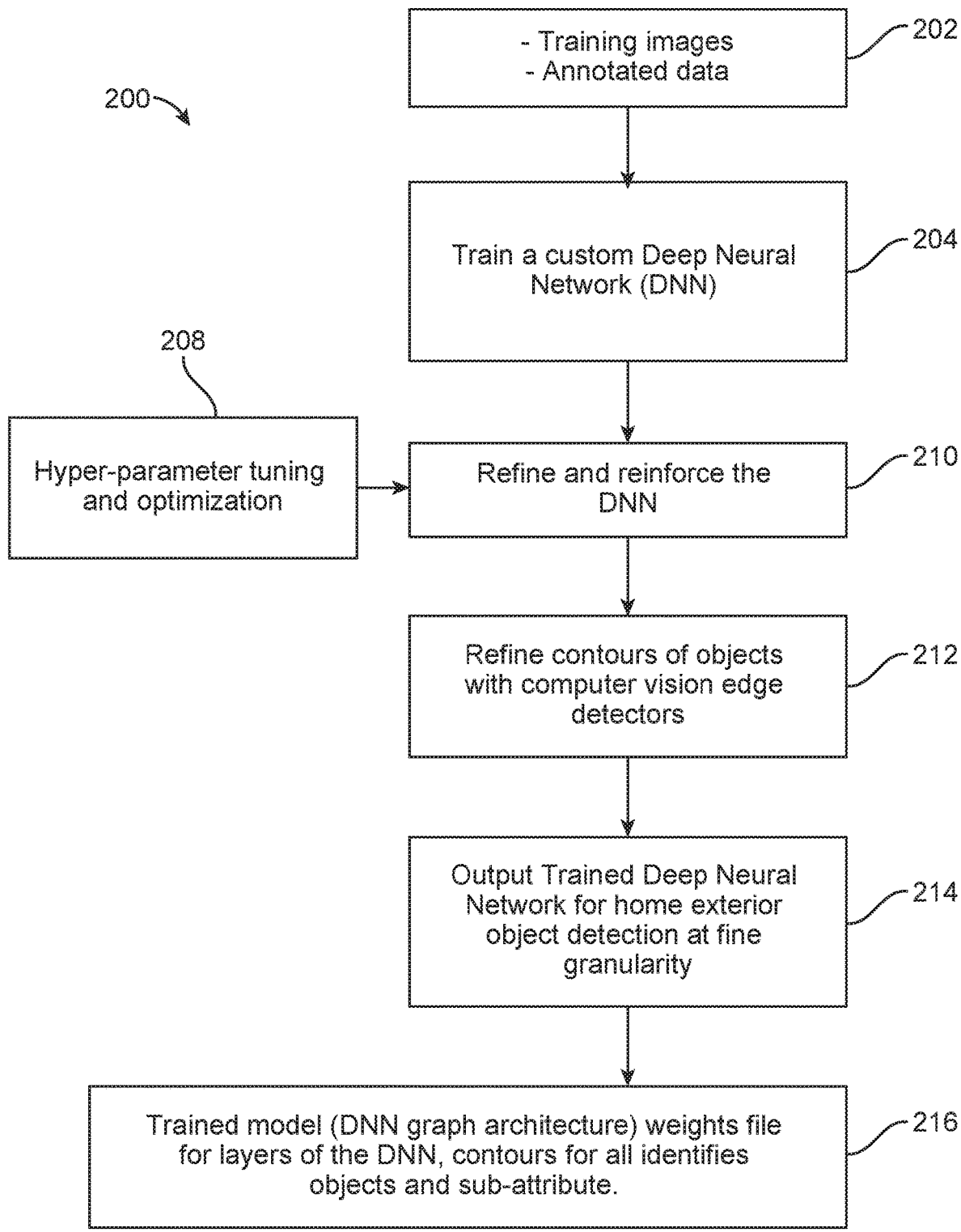
FIG. 2 illustrates a method of training a neural network to identify elements of a home within an image according to one or more embodiments disclosed herein.

The trained model outputs include the neuron input weights and the model structure (the layers of neurons and the connections between the layers), in the form of a graph, that can be used in conjunction to predict elements in the house. In some embodiments, separate models for each element of the house may be used. For example, a model for garage doors, a model for windows, and a model for front doors, among models for other features of a house. Using multiple models provides the home owner greater flexibility in choosing only parts of the houses that they are interested in replacing, for example, only garages and front doors, along with the capability to visualize a complete exterior remodel as well, while limiting computing resources and processing time. The neural network model may be stored and executed on one or more servers or on a portable device and becomes the core to the process determining the elements in a user provided image. FIG. 2 and the description associated therewith provide a more detailed description of the method 200 of training a neural network.

At block 30, a method 300 for detecting elements of a house in an image is carried out. Detecting elements of a house may include capturing or receiving an image of a house, such as a photo of a house, processing the image of the house using the model output from trained deep neural network, as described above in block 20, and providing an annotated and/or measured result for the house in the image. For example, coordinates within the image that define the perimeter of the element or a polygon that defines the element may be provided. In some embodiments, the output may be a mask, such as a mask of an area of individual pixels or a mask of pixels representing the area of a particular element. In some embodiments, for example, we identify siding or painted areas, a mask may be created by identifying the other elements, such as non-siding or painted elements of the house and subtracting those elements to create a mask of the house that includes the siding or painted areas, but without the other elements. Additional image processing techniques are also used to further pinpoint size, location, accurate boundary, color & lighting conditions of the elements. The result may include relative and absolute sizes of the elements in the house, their location in the image, the location of the edges or boundaries of the elements in the image, and labels for the detected elements of the house in the image, and other aspects of the house in the image, such as a mask for each element of the house and lighting characteristics of the image of the house. In some embodiments, the distance and focal points data from the camera metadata are also obtained and are used to predict the real size of the home elements from the deep neural network's predicted outcome. Predicting the real dimensions helps in mapping to the actual costs of the home object elements. FIG. 4A and the description associated therewith provide a more detailed description of the method 300 for detecting elements of a house in an image.

At block 40, a method 400 for modifying elements of a house is carried out. At block 40 one or more of the elements identified in the house is replaced with a replacement element. In some embodiments, a plurality of elements may be replaced with a set of replacement elements. A set of replacement elements may be coordinated replacement elements with coordinated colors, materials, styles, or themes. The replacement elements are matched with an identified element of the house and placed over, blended, or inserted into the image in place of the identified element using various image manipulation techniques to provide the user with an image that depicts the house with the replacement or enhancement. In some embodiments, modifying elements of the house includes modifying the color of the element without replacing the identified element. FIG. 4A and the description associated therewith provide a more detailed description of the method 400 for modifying elements of a house.

Figure 3:
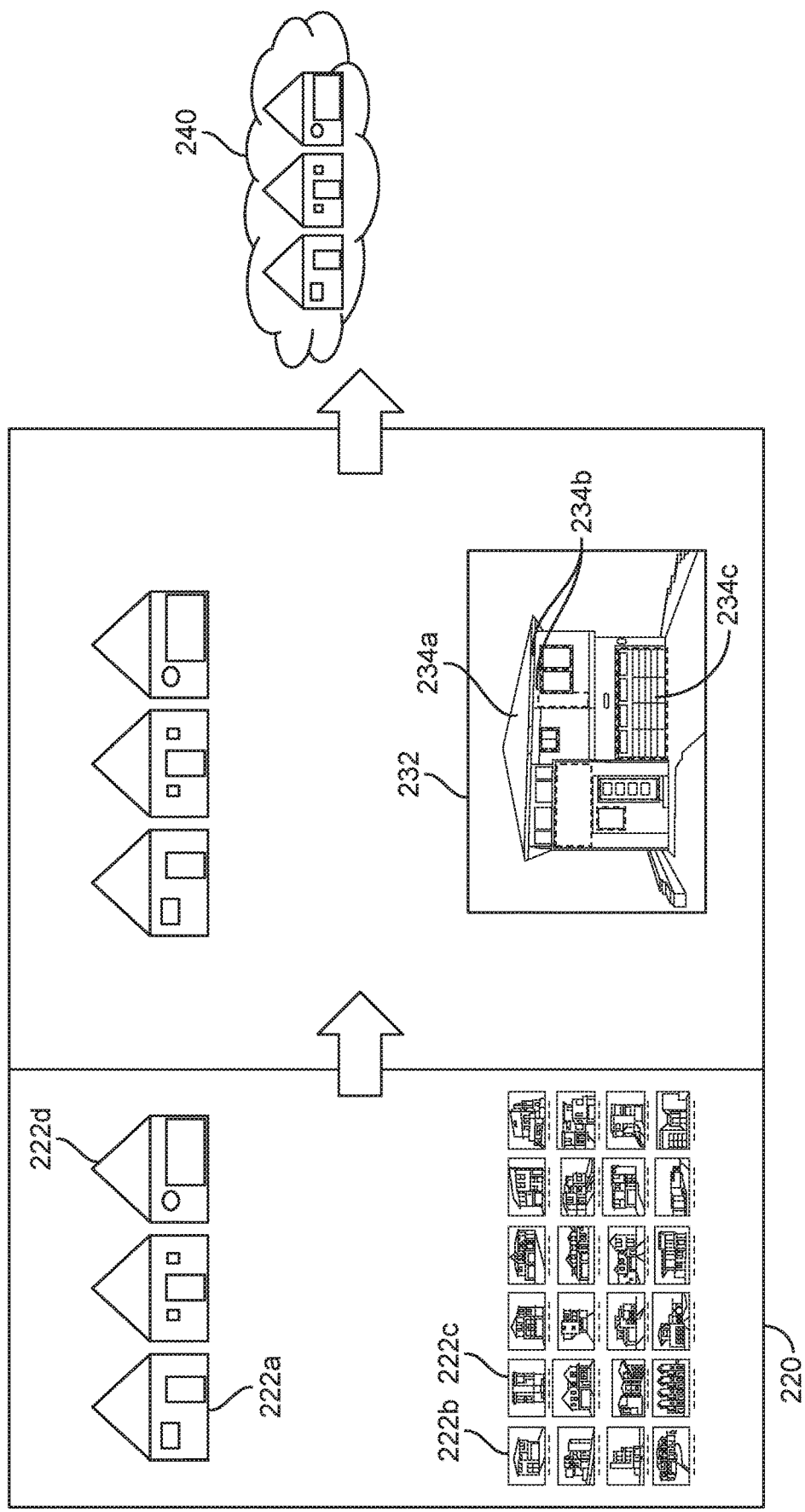
FIG. 3 illustrates portions of the method of FIG. 2 according to one or more embodiments disclosed herein.

Referring now to FIGS. 2 and 3, the method 200 of training a neural network is described. The method 200 may be carried out at block 20 of method 10, discussed above.

At block 202 a set of training images are generated. As shown in FIG. 3, the set of training images 220 includes a plurality of images of houses 222. The images of houses 222 may include images of houses in an as-built state with the surrounding environment also depicted, such as images 222*b* and 222*c*, or images of houses without the surrounding environment, such as shown in images 222*a* and 222*d*. In some embodiments, the images may include only a portion or element of a house, such as just a door or window with immediately adjacent trim and siding.

Each element of a house in a set of training images is identified. The identification includes the location of the element in the image, which may include one or more of a size of the element and location of the element or the position of the outer contour of the element. For example, an element may be identified based on a polygon defined by image coordinates, such as pixel coordinates within the image. The identification may also include annotations for each of the elements. Annotation may include attributes of each element, such as its type (door, window, garage door, etc.), color, style (contemporary, modern, classic, mid-century modern, etc.), material composition (wood, glass, brick, composite, etc). FIG. 3 depicts an annotated image 232 of a house. The annotations 234 may include annotation 234a with respect to the roof, annotation 234b with respect to trim, annotation 234c with respect to a garage door, and other annotations with respect to each element of the house.

In some embodiments, multiple neural networks are trained to detect the elements of the house in the image. For example, each of a plurality of neural networks may be trained to detect a type of element, such as a garage door, window, roof, siding, etc. Each neural network being trained based on the particular type of element annotated in the image.

At block 204, the set of training images 220 are processed to train the neural network. For example, the annotated images may be used to train a deep neural network (DNN). The DNN is trained to find the correct mathematical manipulation to turn the input, in this case an image of a house, into the output, in this case the output being an element of an annotated image of a house. The training of the network assigns weights to each of the virtual neurons in each layer of the neural network to enable the network to calculate the probability of each possible output.

The training further implements additional deep learning architectures as a backbone and transfer learning methods are developed to build our own network. For example, a pre-trained neural network model may be used as the basis for the neural network model. In such an embodiment, early layers of the neural network that identify features such as colors and edges remain, while later layers, such as the last 2 to 4 layers of the neural network model, that refine edges and pixel detection of elements of the house, such as garage doors and identify the particular element, such as distinguishing between a two car garage door and a single car garage door are replaced with new layers.

In some embodiments, when training the model with the replaced layers, the same training data set discussed above, e.g., images and augmented version of the images, are used.

In some embodiments, the training of the neural network includes the use of graphical processing units that are particularly well suited to processing images and greatly increase the speed of neural network training on images as compared to a general purpose processor.

In some embodiments, the neural network is further trained to help determine the relative and absolute size and position of features based on the relative size and shape of objects in the training data. Additional mathematical functions may be used to increase the accuracy of the information provided by the neural network and tune the hyperparameters of the network. For example, by using objects with known standard sizes and ratio of width to height estimates from data to accurately determine the type of object, such as the standard front door, double front door, one and two car garages, and other elements. From these standard sized elements, the model can determine the relative and thus absolute sizes of other elements, such as windows, trim, siding, etc.

At block 210 the neural network is further trained and refined using data science methods 208 such as hyper parameter tuning and optimization. The neural network may also be refined and reinforced with using as optimal choice of validation sets.

Here, the last few layers, such as the last 1, 2, 3, or 4 layers, of the neural network are removed and replaced. These last layers may be layers identified as not contributing to detection and identification in the backbone network of the neural network. These layers may be replaced as discussed above with respect to transfer learning. Once the layers are replaced, the parameters of the neural network are tuned. These parameters include, for example, the loss function, which is tracked to reduce identification and detection losses and for data samples that are relatively smaller in number compared to larger samples by appropriate weighting), the loss function optimizer, the learning rate, the gradient optimizers, for example, via clipping, and the input size of images to the neural network, increasing the epoch size, and learning momentum. In some embodiments, the backbone of the neural network may also be changed, for example, between Resnet 50 and Resnet 101. After the parameter changes, the network is trained on the images and augmented images on different layer combinations within the network, such as only the leading layers, to increase speed, followed by other layers and then the full neural network training which may include switching learning rates from 10^-2 to 10^-5.

At block 212, the edges of the elements of the houses in the training images are refined using edge detectors. The refined elements are then used to further train the neural network. The edge detection may be used in conjunction with manual or semi-automatic annotation of the images to more accurately align the identified outline of an element in the image with the actual edge of the element in the image. In some embodiments, segmentation algorithms, such as pixel clustering is used for contour detection to improve element identification.

At block 212, fragment shader techniques are used for edge detection, edges are used to find the image's vanishing points, the vanishing points are used to perspective correct objects that are being modeled for the house such as garage doors, front doors and windows as an example. Besides being used for final output images, the refined elements are then used to further train the neural network.

At block 214, a trained neural network 240 is output. Here the neural network may be deployed for identifying the elements and their respective attributes in a new image, for example, as discussed with reference to FIG. 4A.

In some embodiments, semi-supervised learning is used to train the neural network. In such embodiments, annotated images are used to train the neural network and the model is output at block 214. Then, the trained model output from block 214 is used to identify elements on a second, sometimes larger, set of test images that are reviewed for accuracy, thus being semi-supervised. This reviewed data set is then used to further train the model. Thus, a larger annotated dataset is built that is used to train the neural network again and make it robust. The auto-annotation tool also helps reduce the human time in annotating images. In some embodiments, the retraining and refinement may occur several times wherein the training of the layers is reinforced, where outputs of previous iterations are used to initialize new trained models along with re-training the final few epochs to allow for burn in of the new data.

At block 216, the neural network architecture, including weights for layers and neurons of the neural network, and contours for all identified elements and the annotations for the attributes of each element in the trained set of images is output. In some embodiments, the neural network architecture includes 50 layers or 101 layers.

Referring now to FIGS. 4A-C and 5, the method 300 for detecting elements of a house in an image and the method 400 for modifying elements of a house are shown and described. Methods 300 and 400 may take place at blocks 30 and 40, respectively, of method 10, discussed.

Method 300 may begin at block 302 where an image of a house is acquired. The image may be a stored image of a house or the image may be capture by a camera. If the image is captured by a camera as part of the method 300 then the method may proceed to block 304 where the user is guided in capturing the image. In some embodiments, a previously captured images may be uploaded from a computing device, such as a desktop.

Figure 6:
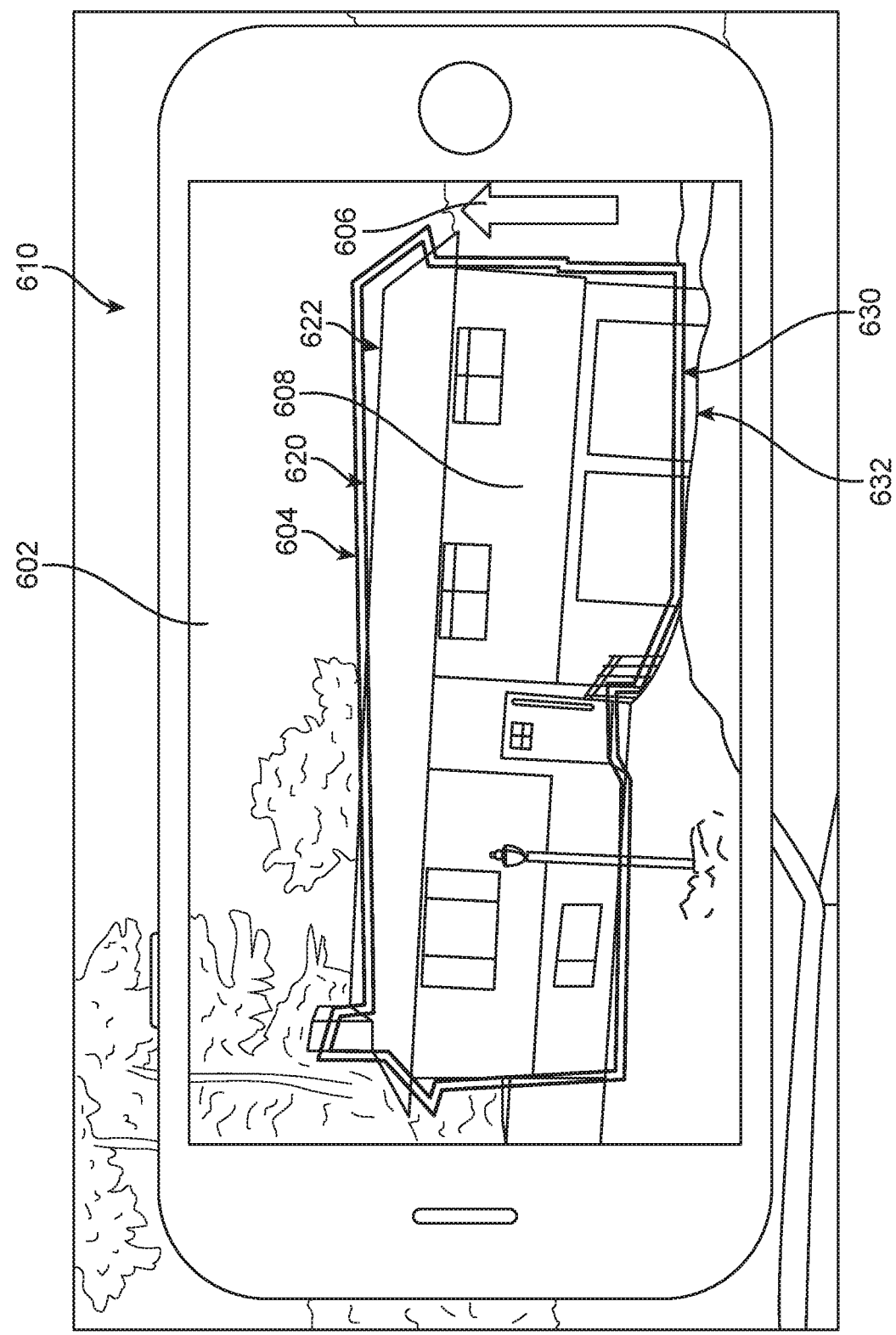
FIG. 6 illustrates a photo capture guide on a handheld device according to one or more embodiments disclosed herein.

With reference to FIG. 6, guiding the user may include displaying a field of view of a camera on a display, such as the display 602 of a mobile device 610, detecting the edges 622, 632 of a structure within the field of view, displaying guidance 604, 606 to aid in aligning the camera and its field of view with the structure 608. For example, the guidance 604 may be an outline of the structure 608, but translated and rotated with respect to the structure 608 to a position and orientation corresponding to a centered location and level orientation with respect to the field of view of the camera. In some embodiments, the outline may include one or more of a roof outline 620 and a door outline 630 that correspond to a roofline 622 and door edge 320, respectively, of the structure 608. These outlines 620, 630 may also aid in aligning the image of the structure 608 within the field of view of the camera.

The handheld device may also include elements such as a gyroscope that may be used to determine the orientation of the camera in three dimensions. Based on the data from the gyroscope the application will provide visual feedback to the user in the application on how to adjust the orientation of the camera to capture the image for highest quality result. In some instances, the application will use this orientation data to auto-adjust the picture after it's captured.

Figure 5:
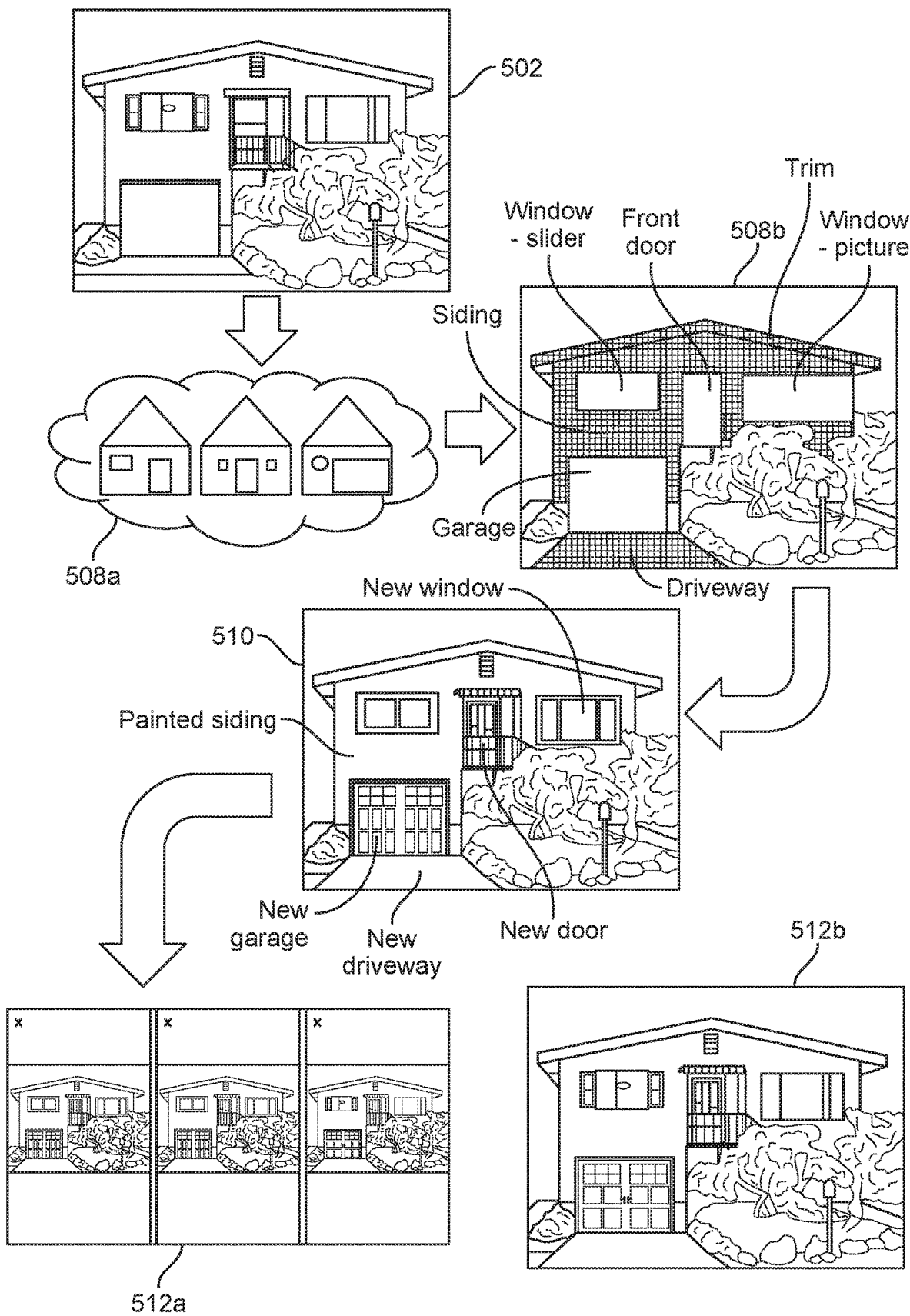
FIG. 5 illustrates portions of the method of FIG. 4A according to one or more embodiments disclosed herein.

Referring back to FIG. 4A, after capturing or otherwise obtaining an image of a structure, such as a house, at block 306 the image is enhanced to improve accuracy in detecting elements within the image. The contrast of the image may be increased. The sharpness may also be increased to aid in increasing the accuracy of the edge and element detection within the neural network during element identification. With reference to FIG. 5, a captured image of a structure 502 is shown. After image enhancement, the image is passed to a neural network, such as the neural network trained as described above.

At block 308, the image 502 captured or acquired at block 302 and enhanced at block 306 is received and processed by a neural network 320. The neural network 320 detects the elements of the house and segments the image 502 into various elements, providing the location and boundary of each element. In some embodiments, the output may be a mask, such as a mask of an area of individual pixels or a mask of pixels representing the area of a particular element. In some embodiments, for example, we identify siding or painted areas, a mask may be created by identifying the other elements, such as non-siding or painted elements of the house and subtracting those elements to create a mask of the house that includes the siding or painted areas, but without the other elements. In some embodiments, the neural network further provides annotations for each identified element, including color, type, material, etc. In some embodiments, the neural network also aids in determining which elements are standard elements such as a standard front door or one or two car garage. In some embodiments, the neural network may provide two sets of output for one object in the image from which the application is then able to calculate the correct coordinates for replacement. From these identified standard elements of known size, for example, a standard front door 80"×30" and the relative sizes of other elements in the image, such as trim, siding, windows, etc, the absolute size of these other elements may be determined and returned with the segmented and annotated image. FIG. 5 depicts the neural network and associated image processing that receives the image 502, processes the image in the cloud, such as on a remote server 508a, and then outputs the processed image 508b.

Figure 7A:
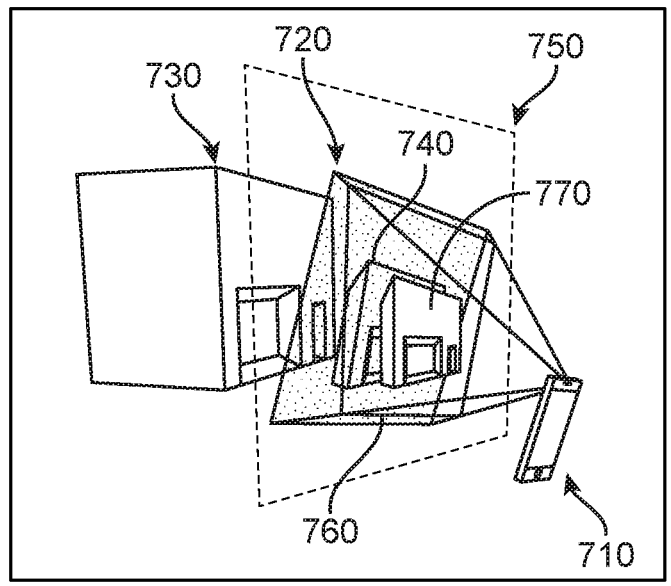
FIGS. 7A, 7B, and 7C depict perspective, front, and side views of image capture of a house, respectively.
Figure 7B:
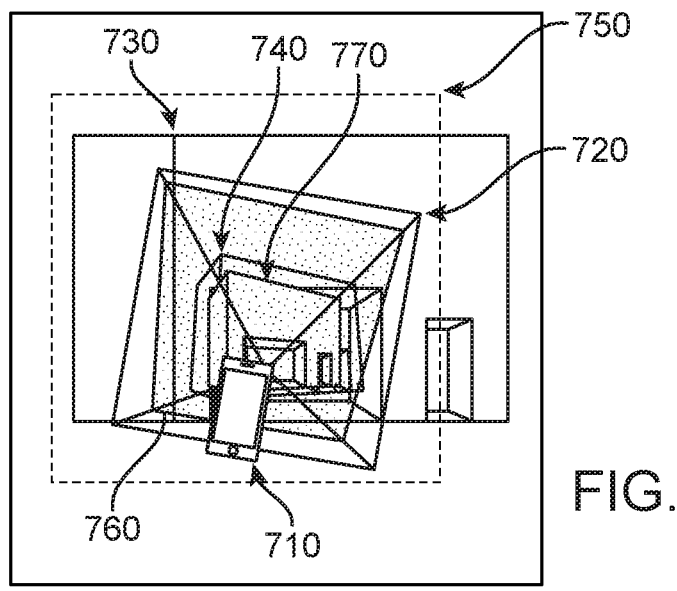
Figure 7C:
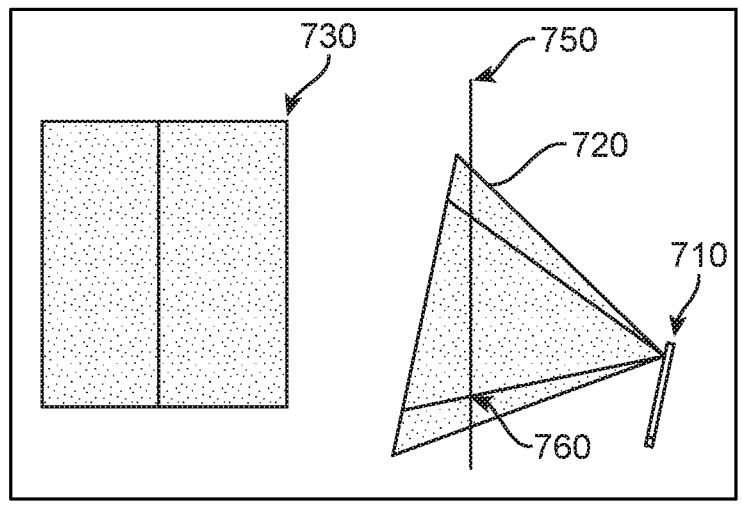
Figure 8:
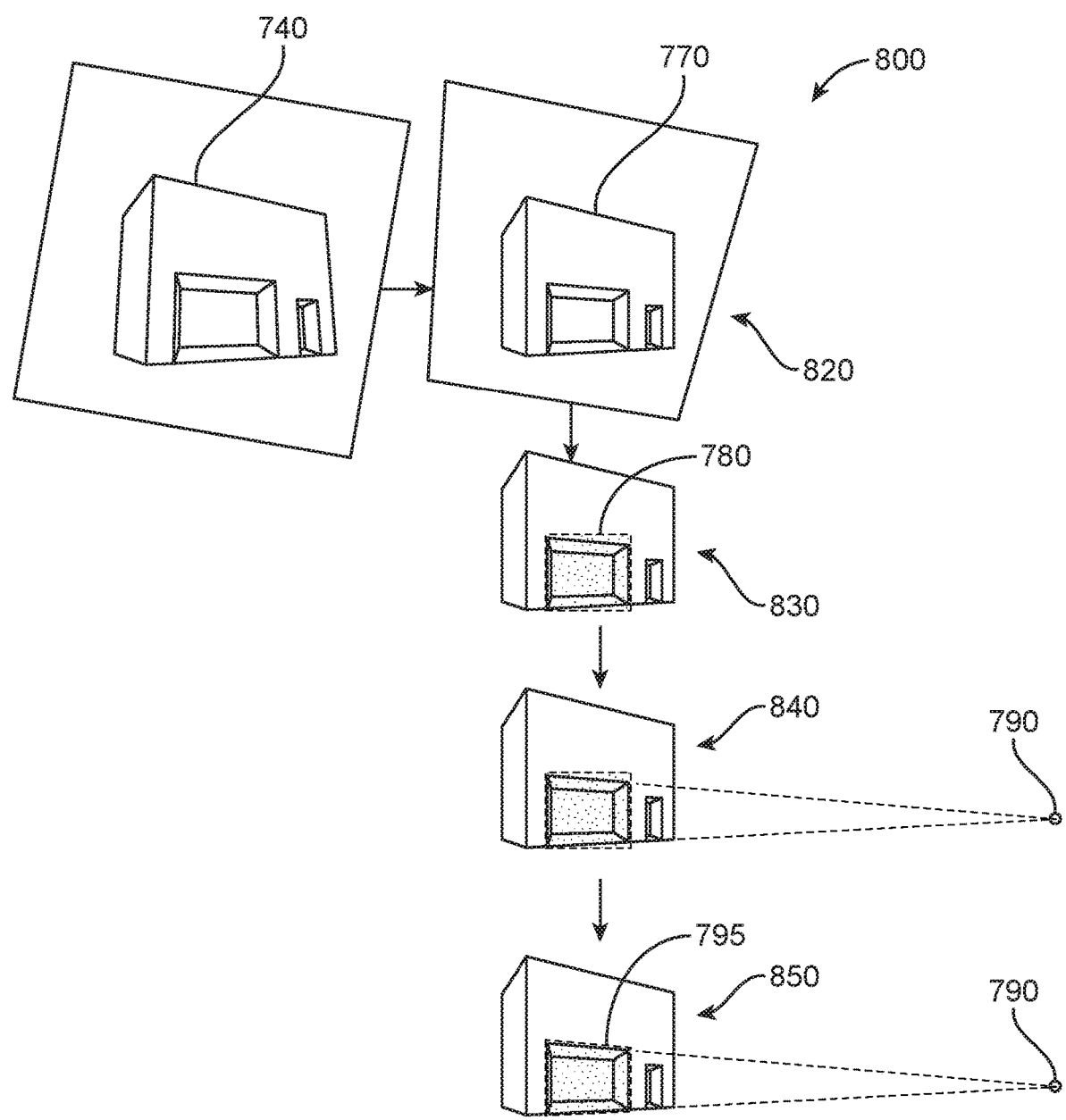
FIG. 8 depicts a process of determining and correcting the perspective of an object in an image.

FIG. 8 depicts a process 800 of determining and correcting the perspective of an object in an image in more detail and FIGS. 7A, 7B, and 7C depict perspective, front, and side views of image capture of a house, respectively. In FIGS. 7A, 7B, 7C, and 8 an imaging device 710, such as a phone is at a distance and orientation with respect to a house 730 and captures a field of view 720 that includes the house 730. The camera 710 captures an image 740 of the house 710.

At block 810 of method 800, an image of the house is captured by the imaging device. In some embodiments, an orientation of the camera is determined from motion and/or orientation sensors on the camera at the time the photo is taken. From the orientation of the camera, a vector, such as a down or vertically orientated vector is determined with respect to the image. At block 820, a vertical plane 750 is constructed based on the down or vertically oriented vector. An intersection between the vertical plane and the plane of the image is determined and the image 740 is projected onto the intersection plane to orientate the vertical lines in the image vertically. This projection result gives a perspective correction of the image so that all verticals of the subject in the photo are now also aligned with the vector by removing the third vanishing point present in an image where the camera is not exactly perpendicular with the horizon.

At block 830, fragment shading techniques are used to find both the vertical and horizontal lines of the image. Lines that are determined to be horizontal in a photo have at least one vanishing point 790 if the subject photo is taken at an angle other than perpendicular to the surface of the subject, such as the house 730. The vanishing point 790 is calculated by the intersection of the detected horizontal lines.

One or more regions of interest 780, which may be elements of a house, such as a door, garage door, window, or other elements discussed herein, is returned by the machine learning model, such as the trained neural network. In some embodiments, this region is rectangular, whereas the depiction of the element in the image is not. From the horizontal edges of the rejoin of interest are modified based on the determined vanishing point to also point at the vanishing point. In that way both the verticals of the region of interest and the horizontals of the region of interest align to the object's perspective in the photo, so that the region of interest now fits the image's perspective.

In some embodiments, the image may be processed through a secondary edge detection process wherein the image is processed to determine the location of edges within the image. After the edges are determined via image processing, the boundary of each element, as determined by the neural network, is compared to the edges within the image. If an edge is found near the boundary of the element, then the boundary of the element may be moved to match the newly detected edge, which is more precise than the previous one detected.

In addition to isolating image elements such as house, roofs, windows and doors using machine learning, as described above, fragment shader techniques may be used for a unique version of image segmentation to isolate these elements. Fragment shader techniques are also used as a unique version of edge detection, edges are used to refine the image's elements such as trim, windows and doors. All together these elements may be isolated to determine the different parts of an image of a building or other man-made object. Once isolated, these elements may be subtracted from the identified building to help define a paintable region. This region is then subjected to color and texture modification for purposes of providing a user a possible future view of the new colors and textures of their building or other man-made object. In some embodiments, the paint or siding areas of a house may be detected like the other elements. For example, by a neural network trained with images paint or siding elements annotated in them.

In some embodiments, paint or siding may be updated and simulated in other ways, such as via image processing techniques as well as deep neural network approaches. For example, style transfer techniques using image to image translation methods built on top of generative adversarial networks (GAN) or adaptations of these may be used to identify and transfer a paint style used on one house and translate that to another house.

In some embodiments, the neural network 320 may be further trained to detect image lighting details such as shadows, glare, reflections, and other lighting of the captured image. These lighting details may then be used later, such as at block 310, where the lighting details may be applied to the updated house image, such that replacement elements retain the lighting details of the elements they replace.

At block 310, filters are applied to the house in the image. Filters may be a predetermined set of replacement elements. The filters may be based on local or national building and design trends, and may be ranked based on popularity or suitability with the style of house depicted in the image. For example, modern elements being favored over craftsman elements when the image depicts a modern house. The replacement elements may be stored in a database of elements 325a. A set of replacement elements may be coordinated replacement elements with coordinated colors, materials, styles, or themes. The replacement elements are matched with an identified element of the house and inserted over the identified element. In some embodiments, filters may include modifications to the elements in the house image, for example, rather than replacing the siding or trim with different siding and trim, the color of the siding and trim may be replaced or changed. With reference to FIG. 5, image 510 shows the captured image with a filter applied. Applying the filter results in replacing the windows, front door, garage door, and driveway elements, with replacement elements, but merely changing the color of the siding, without replacing the siding with a replacement element. Modified house images 342 depict alternative filters applied to a house image, the user being able to change between filter images 342. On a touch-based device a user may swipe between filters.

In some embodiments, a filter may be created based off of a supplied image. For example, a user may desire to see what their house might look like if it included elements of another house that they liked. In such an embodiment, an image of a house having the desired elements may be processed though the neural network trained computer vision model and the elements and their attributes extracted. The extracted elements and their attributes may be used to find matching elements within an element database 325. The matching elements may then be applied to the image of the user's house to show an example of what the house would look like if updated to the desired style. In some embodiments, the extracted elements of the house having the desired elements may be directly applied to the image of the user's house. Users can save these desired scenes as favorites for storage and collection in the app. Users can also easily share these updated images with contacts as before and after images. They can also post the image within the community of application users and request feedback.

In some embodiments, filters may include additional elements not present in the original house image. For example, a user may choose fun filters to customize their home for entertainment. For example, a Christmas filter may include holiday decorations that are added elements to their house, such as Christmas lights along the trim and snow on the roof and the yard. For Halloween, a filter may include lights and spooky decorations and, for Independence Day, a patriotic theme including flags and custom red, white, and blue paint may be used.

At block 312, a customization tool 340 and database of elements 325b are provided. Unlike using filters, where multiple elements or attributes of the image are replaced based on a coordinated set of replacement elements and attributes, the customization tool 340 allows a user to individually select replacement elements and attributes from the database of elements 325b to replace elements and attributes in the image one by one. Referring to FIG. 5, image 512b depicts a user customized house.

At block 314, estimated costs for the selected replacement elements and attributes are determined. The estimated costs may be determined based on the costs of replacement elements stored in a database, such as the replacement elements database 325b and the sizes and areas of the elements in the house, as determined by the neural network. Costs may also be estimated by retrieving component pricing for each replacement element or attribute from suppliers. Labor costs for replacing elements or applying different attributes, such as painting a house, may be determined based on supplier provided pricing, known labor costs, location specific data, or other means.

In some embodiments, the purchase price for each replacement element along with the labor and installation costs may be provided for each element to aid in a user's home improvement decision making process.

Figure 9:
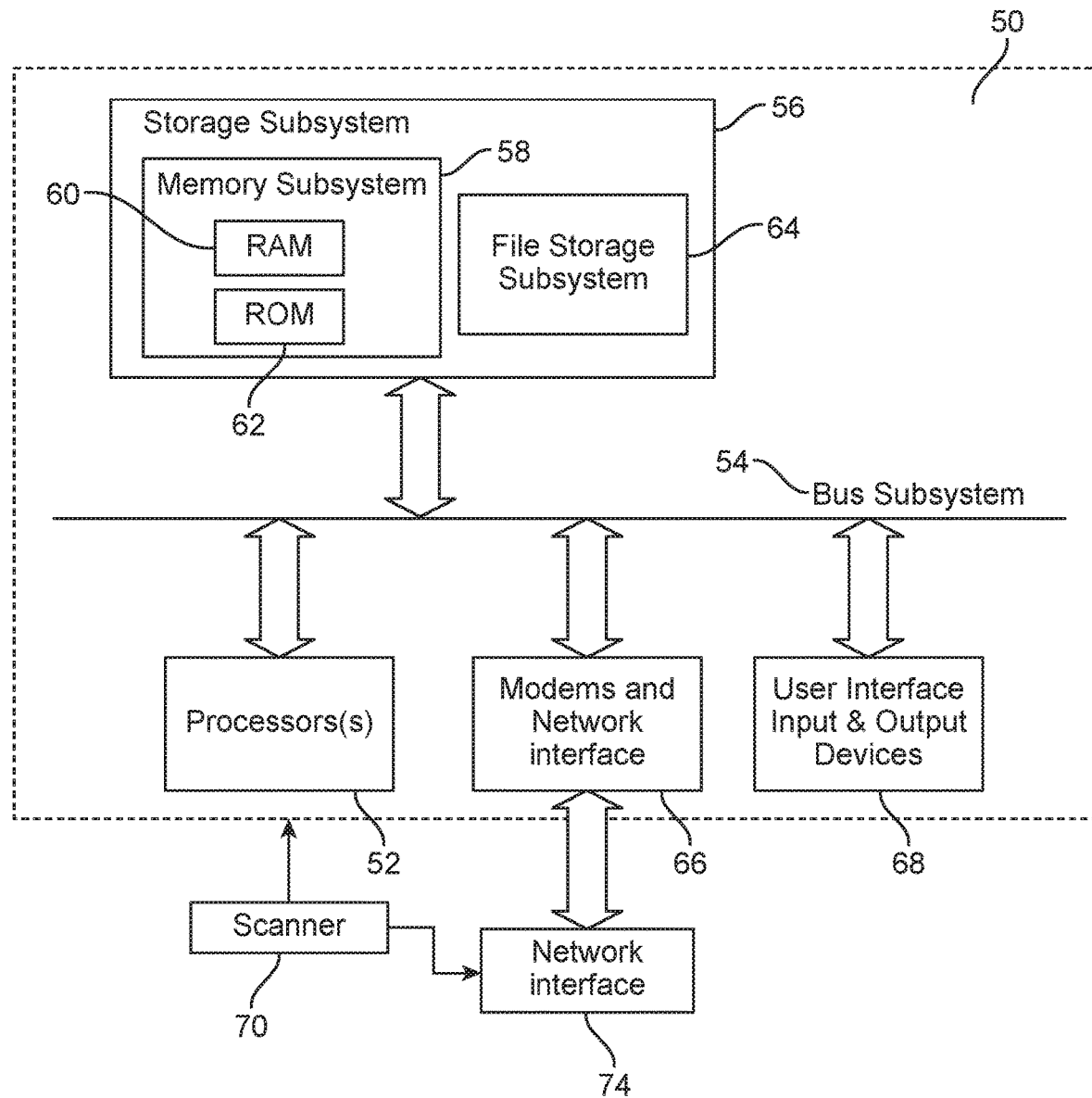
FIG. 9 depicts a system for carrying out the methods described herein.

A simplified block diagram of a data processing system 50 is illustrated in FIG. 9. Data processing system 50 includes at least one processor 52 or a plurality of processors which communicates with a one or more peripheral devices over bus subsystem 54. These peripheral devices typically include a storage subsystem 56 (memory subsystem 58 and file storage subsystem 64), a set of user interface input and output devices 68, and an interface to outside networks 66, including the internet. This interface is shown schematically as "Modems and Network Interface" block 66 and is coupled to corresponding interface devices in other data processing systems over communication network interface 74. Data processing system 50 may include a terminal or a low-end personal computer or a high-end personal computer, workstation or mainframe, cloud computing device or devices, a distributed computing system, or a portable device, such as a smartphone or tablet.

The user interface input devices may include a keyboard (mechanical or software) and may further include a pointing device and a scanner 70, such as a camera. The pointing device may be an indirect pointing device such as a mouse, trackball, touchpad, or graphics tablet, or a direct pointing device such as a touchscreen incorporated into the display. Other types of user interface input devices, such as voice recognition systems, may be used.

User interface output devices may include a printer and a display subsystem, which includes a display controller and a display device coupled to the controller. The display device may be a cathode ray tube (CRT), a flat-panel device such as a liquid crystal display (LCD) or OLED, or a projection device. The display subsystem may also provide non-visual display such as audio output.

Storage subsystem 56 maintains the basic programming and data constructs that provide the functionality of the methods described herein. Software modules that include instructions for carrying out the methods and steps discussed herein may be stored in storage subsystem 56. Storage subsystem 56 may include memory subsystem 58 and file storage subsystem 64.

Memory subsystem 58 may include a number of memories including a main random access memory (RAM) 60 for storage of instructions and data during program execution and a read only memory (ROM) 62 in which fixed instructions are stored. The ROM may also include portions of the operating system and the BIOS (basic input/output system).

File storage subsystem 64 provides persistent (nonvolatile) storage for program and data files, and may include at least fixed storage drive and at least one removable storage drive (with associated removable media). There may also be other devices such as a CD-ROM drive and optical drives (all with their associated removable media). One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected over various local-area or wide-area network media, including telephone lines. Similarly, the input devices and display need not be at the same location as the processor.

Bus subsystem 54 is shown schematically as a single bus, but a system may include a number of buses such as a local bus and one or more expansion buses, as well as serial and parallel and other communication ports such as USB, Lightning, DisplayPort and others. Network connections may be established through a device such as a network adapter on one of these expansion buses or a modem on a serial port. The client computer may be a desktop system or a portable system.

Scanner 70 is responsible for capturing images for the data processing system 50 for further processing. In a distributed environment, scanner 70 may be located at a remote location such as on a smartphone or tablet and communicate scanned digital data set information to data processing system 50 over network interface 74 for processing by the neural network.

While preferred embodiments of the present invention have been shown and described herein, it will be apparent to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A method of home improvement visualization, comprising:
   receiving an image of a house;
   detecting elements within the image of the house using a neural network;
   detecting edges in the image using image processing edge detection techniques;
   refining a location of the elements using the detected edges in the image;
   correcting the perspective of an updated element based on the detected edges in the image; and
   replacing one or more of the detected elements with the perspective corrected updated element.

2. The method of claim 1, wherein correcting the perspective of the image includes determining a vanishing point in the image.

3. The method of claim 2, wherein determining a vanishing point includes:
   identifying the vertical plane at the time the image was captured;
   projecting a plane of the image onto the vertical plane;
   receiving a region of interest from the neural network;
   determining the horizontal edges within the region of interest;
   determining the location of the vanishing point based on the orientation of the horizontal edges; and
   orienting the horizontal edges of the house by transforming the image while maintaining the orientation of the vertical edges.

4. The method of claim 3, where the region of interest includes at least one detected element and orienting the horizontal edges of the of the house includes orienting the horizontal edges of the at least one detected element.

5. The method of claim 1, further comprising:
   replacing one or more of the detected elements within an updated element includes resizing and transforming the updated element to match the size and orientation of the detected element within the image.

6. The method of claim 1, wherein the neural network is trained by:
   receiving a set of annotated images of houses to train the neural network;
   augmenting the set of annotated images of houses to generate additional annotated images of houses for the neural network;
   processing the annotates images of houses and the additional annotated images of houses to train the neural network;
   refining the set of annotated images of houses by detecting the edges elements in the images and adjusting the annotations based on the edge detection; and
   outputting the trained neural network.

7. A system comprising:
   one or more processors; and memory comprising instructions that when executed by the one or more processors causes the system to:
- receive an image of a house;
- detect elements within the image of the house using a neural network;
- detect edges in the image using image processing edge detection techniques;
- refine a location of the elements using the detected edges in the image;
- correct the perspective of the image; and
- replace one or more of the detected elements with an updated element.

8. The system of claim 7, wherein the instructions to correct the perspective of the image include instructions to determine a vanishing point in the image.

9. The system of claim 8, wherein the instructions to determine a vanishing point include instructions to:
- identify the vertical plane at the time the image was captured;
- project a plane of the image onto the vertical plane;
- receive a region of interest from the neural network;
- determine the horizontal edges within the region of interest;
- determine the location of the vanishing point based on the orientation of the horizontal edges; and
- orient the horizontal edges of the house by transforming the image while maintaining the orientation of the vertical edges.

10. The system of claim 9, wherein the region of interest includes at least one detected element and the instruction to orient the horizontal edges of the of the house include instructions to orient the horizontal edges of the at least one detected element.

11. The system of claim 7, wherein instructions to replace one or more of the detected elements within an updated element includes instructions to resize and transform the updated element to match the size and orientation of the detected element within the image.

12. The system of claim 7, wherein the memory further comprises instructions to train the neural network by causing the system to:
- receive a set of annotated images of houses to train a first neural network to identify first type of element within an image, the set of annotated images including polygons surrounding the first type of elements within the image;
- augment the set of annotated images of houses to generate additional annotated images of houses for the neural network;
- process the annotates images of houses and the additional annotated images of houses to train the neural network;
- refine the set of annotated images of houses by detecting the edges elements in the images and adjusting the annotations based on the edge detection;
- output the first trained neural network;
- receive a second set of annotated images of house to train a second neural network to identify the style of the first type of element;
- process the second set of annotated images of the house to train the second neural network to identify the style of the first type of element; and
- output the second trained neural network.

13. The system of claim 12, wherein the type of element is a garage door and the style of the first type of element is a dog-eared garage door or an arched garage door.

14. The system of claim 7, wherein the instructions to detect elements within the image of the house using a neural network comprise instructions to:
- detect a first element within the image with a first neural network;
- detect a style of the first element using a second neural network; and
- determine the vertices of the first element using a neural network trained to determine the vertices of the style of the first element, the style being one or more of a dog-eared element or an arched element.

* * * * *